UNITED STATES PATENT OFFICE.

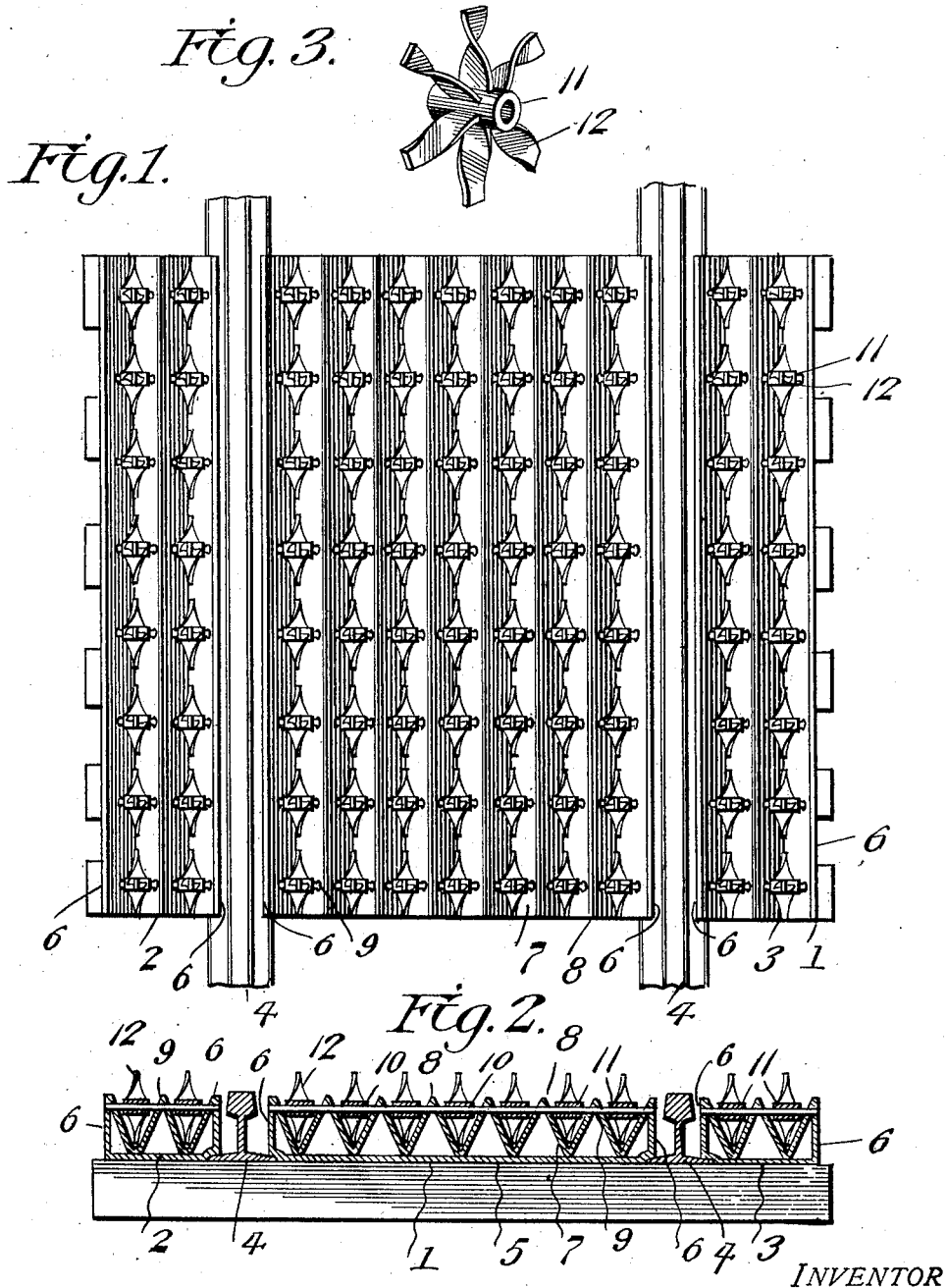

HERBERT O. AVENT, OF MIDDLEBURG, TENNESSEE.

CATTLE-GUARD.

No. 833,108.
Specification of Letters Patent.
Patented Oct. 9, 1906.

Application filed February 24, 1906. Serial No. 302,707.

*To all whom it may concern:*

Be it known that I, HERBERT O. AVENT, a citizen of the United States, residing at Middleburg, in the county of Hardeman and State of Tennessee, have invented new and useful Improvements in Cattle-Guards, of which the following is a specification.

This invention relates to cattle-guards, the object of the invention being to provide a simple and effective guard for railway-crossings and between fields to prevent cattle and smaller animals, such as sheep or swine, from passing across the track, the construction of the guard being such as to prevent the animals from obtaining a foothold thereon, at the same time avoiding injury to the animals.

With the above and other objects in view the invention consists in the novel construction, combination, and arrangement of parts hereinafter more fully described, illustrated, and claimed.

In the accompanying drawings, Figure 1 is a plan view of a cattle-guard embodying the present invention. Fig. 2 is a sectional view thereof. Fig. 3 is a detail perspective view of one of the spoked or bladed wheels.

The cattle-guard may be composed of a plurality of sections 1, 2, and 3, arranged between the rails (shown at 4) and upon the outer sides thereof, as shown in Figs. 1 and 2. Each of said sections under the preferred embodiment of this invention comprises a base-plate 5, flanges 6 at opposite sides thereof, and an intervening tread portion formed of metal bent at various intervals to form alternate V-shaped depressions 7 and ridges 8, as clearly shown in Fig. 2.

Extending transversely through the zigzag portions of the tread-surface just beneath the apexes of the ridges are parallel rods or shafts 9. Any number of these rods or shafts may be employed, and upon each shaft is arranged a series of rotary elements or wheels 10, which wheels operate within the valleys or depressions of said surface, as shown in Figs. 1 and 2. Each wheel comprises a hub 11 and a plurality of spokes or blades 12, radiating therefrom, each of said blades being preferably formed of a piece of flat sheet metal secured rigidly to the hub 11 and given a quarter-turn before the outer extremity thereof is reached, so as to dispose the outer edge of each blade or spoke at right angles to the axis of the wheel, thus enabling the spokes or blades to move well down into the valleys or depressions 7 of the tread-surface of the guard, as shown in Fig. 2.

The rotary wheels form an extremely unstable support for the feet of the animal as he attempts to cross the track and cause the animal's feet to slip sufficiently to dissuade him from making a further attempt at crossing the track without injuring the animal's feet, there being no sharp prongs or spikes to penetrate the feet. The guard as a whole is made of sufficient area to prevent animals from jumping entirely across the same. The base and tread portions of the sections of the cattle-guard may be formed of sheet metal of comparatively light gage, in view of the fact that the parallel ridges are securely braced relatively to each other by means of the rods or shafts 9 and the further fact that the vertices of the depressions rest upon and are supported by a base 1, which is in turn supported by the rail-ties. The guard-sections may be spiked or otherwise secured permanently to the ties.

I claim—

1. A cattle-guard comprising a tread-surface having alternate parallel ridges and depressions, parallel rods or shafts extending at right angles thereto and connecting the ridges, and rotary elements journaled on said rods or shafts.

2. A cattle-guard having a tread-surface formed out of sheet metal bent in zigzag shape to form parallel alternate ridges and depressions, and rotary elements mounted and operating within said depressions between the ridges.

3. A cattle-guard comprising a sheet-metal tread-surface having alternate ridges and depressions, a base upon which the tread-surface is supported, parallel rods or shafts extending transversely of the ridges and connecting the same, and rotary devices journaled on said rods or shafts and working in the depressions between the ridges.

4. A cattle-guard comprising a tread-surface composed of parallel alternate ridges and depressions, and rotary elements journaled in the depressions between the ridges and each comprising a hub and a series of flat blades extending outward therefrom and given a quarter-twist, whereby the outer edges of the blades are disposed at a right angle to the axis of movement of the rotary device.

In testimony whereof I affix my signature in presence of two witnesses.

HERBERT O. AVENT.

Witnesses:
 JAMES R. SWINTON,
 G. A. BLACK.